United States Patent [19]
Krupp et al.

[11] 3,740,480
[45] June 19, 1973

[54] TIME DIVISION MULTIPLEX SWITCHING SYSTEM UTILIZING ALL TIME DIVISION TECHNIQUES

[75] Inventors: Roy Stephen Krupp, Rumson; Lawrence Andrew Tomko, Middletown, both of N.J.

[73] Assignee: Bell Telephone Laboratories, Incorporated, Murray Hill, N.J.

[22] Filed: Dec. 27, 1971

[21] Appl. No.: 212,089

[52] U.S. Cl. .......... 179/15 AQ
[51] Int. Cl. .......... H04j 3/16
[58] Field of Search .......... 179/15 AQ

[56] References Cited

UNITED STATES PATENTS 3,632,883 1/1972 Aagaard .......... 179/15 AQ

*Primary Examiner*—Ralph D. Blakeslee
*Attorney*—W. L. Keefauver

[57] ABSTRACT

Time slot interchangers in each of plural input time division multiplex signal paths to a switching network shift input time slot signals to respective operational time slots corresponding to different switching circuits. A mass serial-parallel converter takes all of the input path signals from the mentioned interchangers in each time slot and steers them in series to the switching circuit corresponding to that operational time slot. Further, time slot interchangers shift the signals in the respective switching circuits to new time slot positions corresponding to different output circuits. Another converter steers the new time slot signals from all of the switching circuits in series to the output circuit corresponding to that new time slot. Finally, time slot interchangers in each of the output circuits shift the signals in their respective output circuits to destination time slot positions thereby completing both the line switching and the time slot interchanging operations.

14 Claims, 9 Drawing Figures

TIME DIVISION MULTIPLEX SWITCHING SYSTEM UTILIZING ALL TIME DIVISION TECHNIQUES

BACKGROUND OF THE INVENTION

1. Field of the Invention

This invention relates to time division multiplex switching networks and it relates more particularly to such a network wherein time slot interchanging functions are employed to carry out line switching operations.

2. Prior Art

Space division switching has traditionally been done by some form of crosspoint switching matrix, i.e., a matrix in which a crosspoint switch is activated at a particular time to establish a particular space path routing. In some limited sense, time domain switching has been done by the employment of a time slot interchanger, in a communication path established by matrix switching, to enable communication between subscriber stations utilizing different time division multiplex frame time slots. There may also be said to be limited time domain switching functions involved in space division switching matrices which utilize signal delay storage at the matrix crosspoints to accomplish some time slot shifting for facilitating the space division switching operation.

However, regardless of the extent of time slot shifting in prior art systems, the space division switching operation for any significant number of signal paths has generally required some form of crosspoint switching matrix.

Space division switching matrices are utilized in tandem for large switching networks, and they require complex connecting link arrangements between the switching matrix stages. These matrices and link arrangements become increasingly difficult to install, to alter, and to maintain as the size of a switching office increases. Furthermore, the space required in an office for such matrix and link arrangements is substantial.

There is also a further difficulty with current art switching networks, and this arises from the inconvenience of implementing the matrix arrangements in newly evolving planar shifting technologies such as those utilizing magnetic single-wall domains, charge coupled devices, or the so-called "bucket brigade" devices.

It is, therefore, one object of the present invention to improve switching networks for time division multiplex systems.

It is another object to reduce the complexity of switching network connections.

A further object is to facilitate the implementation of a switching network in a planar shifting technology.

STATEMENT OF THE INVENTION

The foregoing and other objects of the invention are realized in an illustrative switching network in which a plurality of space divided time division multiplex signal paths provide time division multiplex signals of conventional type from various system terminations, here designated calling terminations. A time slot interchanger in each path converts the signals to a format wherein each time slot is dedicated for use by a certain space divided circuit regardless of the origin or destination of signals received into the circuit. A mass series-parallel converter steers the signals in each time slot to a different switching circuit where at least one stage of time slot interchanging performs line switching functions. The resulting time division signals are then reconverted to a conventional time division format on network output circuits to which the respective called terminations have access.

It is one feature of the invention that mass serial-parallel converters are utilized to steer signal-parallel time slot signals in each time slot on plural circuits to a circuit which is dedicated to use by that particular time slot in a signal-series format.

It is another feature that the use of tandem stages of time slot interchangers which are coupled together through interstage mass serial-parallel converters enables relatively easy realization of path expansion or concentration in a network input or output stage in order to permit the attainment of either low network blocking probabilities or more efficient use of intermediate network stages.

A further feature of the invention is that connect-search operations are simplified because in a three-stage switching network it is necessary only to ascertain the input and output time slot and line numbers in the usual manner for time division networks and then match output time slots of the input stage and input time slots of the output stage to indicate a free time slot path through the remainder of the network. That free time slot is dedicated to a particular switching circuit in the central stage of the three stages and a time slot interchanger in the circuit does the necessary switching in the time domain with space division significance.

Yet another feature of the invention is that the time division switching principles utilized in the aforementioned three-stage network are readily extensible to more complex switching networks, such as, network facility switches or a large toll switching machine.

BRIEF DESCRIPTION OF THE DRAWING

A more complete understanding of the invention may be obtained from a consideration of the following detailed description in connection with the appended claims and the attached drawings in which:

DETAILED DESCRIPTION

Figure 1:
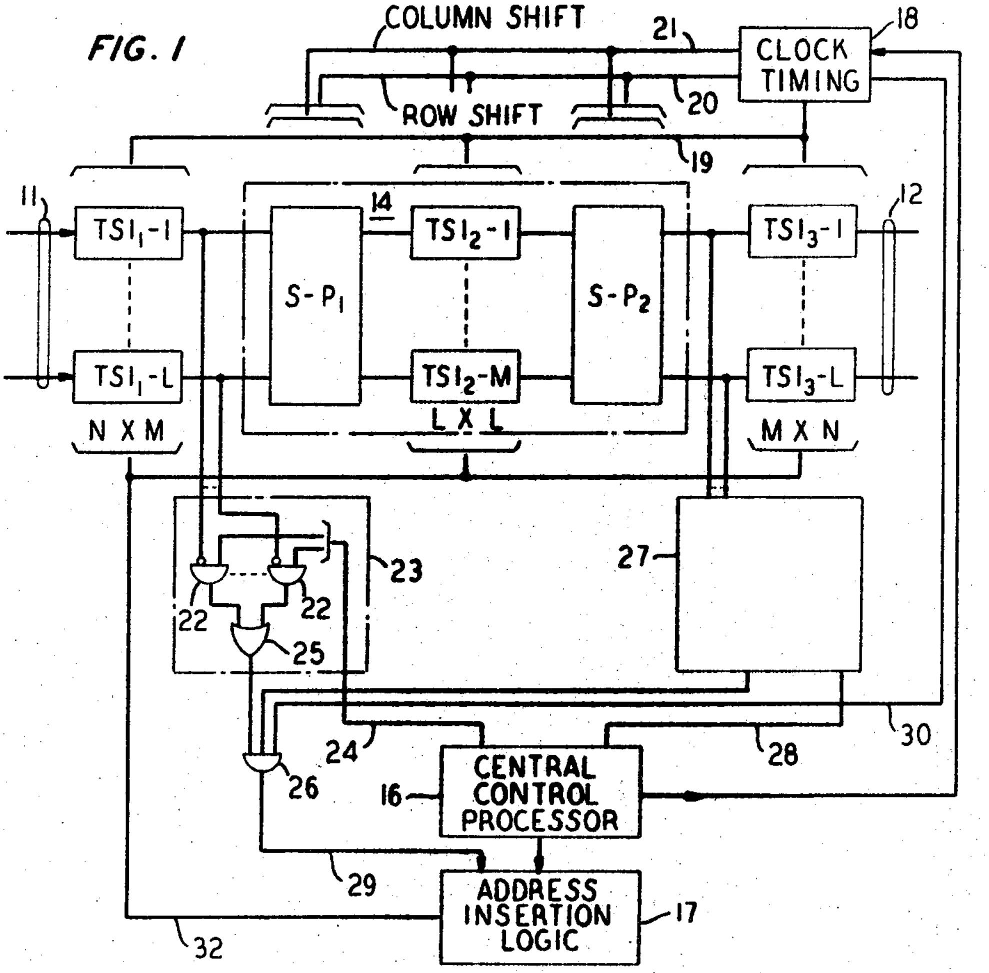
FIG. 1 is a simplified block and line diagram of a three-stage switching network utilizing the principles of the invention.

FIG. 1 is a simplified block and line diagram of a three-stage switching network utilizing the present invention. A plurality of input time division multiplex signal paths 11 provide signals in some sequence of time slots in recurrent time frames. Each time slot signal represents a time gated segment of a communication signal from some circuit termination, not here specifically shown. For convenience of discussion, it will be assumed that such terminations are calling telephone service subscribers and that the time division signals are placed in the mentioned time slot sequence by a separate multiplexer for each of the time division signal paths 11. Each time slot signal may include one or more signal bits in each time slot word of the time division signal frame depending upon the type of system application involved. The various time slots signals are propagated through the network of FIG. 1 in predetermined paths to appear on output time division signal paths 12 which are similar to the input paths 11 and wherein the frame signal composition is different from that on the input paths 11 as determined by line switching functions and time slot interchanging functions performed within the network as will be hereinafter described.

Within the network of FIG. 1, three stages of time slot interchangers, designated $TSI_n$, are provided. The subscript $n$ is utilized to designate the number of the stage in which a particular interchanger is found, and the stage numbering extends from input paths 11 toward output paths 12. Interchangers of adjacent pairs of stages are interconnected by mass series-parallel converters, designated $S\text{-}P_n$, wherein the subscript $n$ designates the converter stage in similar fashion. Within each of the interchanger stages, plural time slot interchangers of any convenient type are utilized; and in the illustrative embodiment of FIG. 1, L such interchangers are employed in the first and third stages while M interchangers are employed in the second stage. For purposes of the present description, the time slot interchangers are advantageously of the type disclosed and claimed in our copending application Ser. No. 204,143, filed Dec. 2, 1971, entitled "Dynamically Switching Time Slot Interchanger" and assigned to the same assignee as the present application. The time slot interchanger of that application is one which is capable of being implemented by means of magnetic single-wall domain devices.

Each time slot interchanger of the first stage in FIG. 1 is adapted for performing the time slot interchange function with respect to input time division signals having N time slots per frame and providing an output time division signal having M time slots per frame. N and M may be equal to one another or they may be unequal as indicated in our aforementioned time slot interchanger application and as required for the type of blocking probability which is to characterize any particular switching network application. The third stage of the network in FIG. 1 includes time slot interchangers of the inverse M × N time slot handling capabilities; but the interchangers in the second stage of the network in FIG. 1 are M in number and have an L × L time slot accommodating capability.

Figure 2:
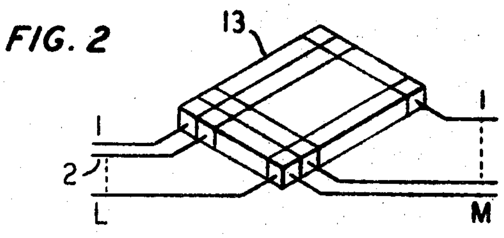
FIG. 2 is a functional diagram of a mass series-parallel converter utilized in FIG. 1.

The converters $S\text{-}P_1$ and $S\text{-}P_2$ cooperate with an intermediate switcher stage $TSI_2$ of interchangers to perform the function of a time shared space division switch 14. S-P converter operation is equivalent to that which may be conceived to be performed by a two-dimensional shift register; and such a function is represented by such a register 13 in FIG. 2. Each such converter is conceptually considered to convert an input circuit, or signal path, number to an output time slot number. This function is accomplished by taking time slot signals on the L input circuits to converter $S\text{-}P_1$ from the interchangers of stage $TSI_1$ in time slot signal-parallel fashion in each time slot and steering those signals to a different one of the M output, or switching, circuits of the converter in signal-series fashion. Each of those M switching circuits includes a different one of the M time slot interchangers of stage $TSI_2$ and is dedicated to the service of signals of only one correspondingly numbered output signal time slot from the interchangers of stage $TSI_1$.

There are various possible ways to perform the mass series-parallel conversion. One such way is to employ conventional discrete device shift registers with dual stage input connections. Each shift register stage may be selectively connected for operation in a first register stage group clocked for operation as a row shift register for receiving signals from one of the L input circuits from network stage $TSI_1$ or alternatively selected for connection in a second group of stages which is clocked for operation as a column shift register to provide outputs on one of the M switching circuits to the interchanger stage $TSI_2$. With this type of two-dimensional shift register, the stages are first configured as row shift registers; and the L time division signals from stage $TSI_1$ which signals have M time slots per frame, are shifted in signal-parallel into the register 13 of FIG. 2. When a full frame of the L signals have been shifted into the register 13, the register stages are reconfigured by timing signals into the column register format for shifting those signals out onto respective ones of the M switching circuits to the stage $TSI_2$. A two-dimensional shift register operation of the type just outlined requires the use of two sets of converters in each converter stage so that one set can operate in the input mode in the row register configuration, while the other is operating in the output mode in the column register configuration. At the end of each time division signal frame at the input to stage $S\text{-}P_1$, the timing signals reconfigure each set of converter registers to operate in the other mode.

Another way to perform the mass series-parallel conversion is that which is disclosed and claimed in our copending application Ser. No. 212,005, filed on even date herewith and entitled "Electrically Controllable Steering Arrangement for Magnetic Single-Wall Domain Propagation Paths" and assigned to the same assignee as the present application. The two-dimensional shift register of the last-mentioned application performs the mass series-parallel conversion by operating simultaneously in the input and output modes. Consequently, a full frame of input signals is shifted into the register at the same time that the time slot signals of a preceding frame are being propagated along the column signal paths out of the two-dimensional register. In the switching network of FIG. 1, it is presumed for purposes of illustration that the last-mentioned single-wall domain-type of converter is employed.

As has been already described, the time slot interchangers of stage $TSI_2$ in the respective switching circuits shift the operational time slots of signals received from the converter $S\text{-}P_1$ into time slots which are specifically dedicated for service by different ones of predetermined network output circuits. These time slot interchanged signals from the M interchangers of stage $TSI_2$ are applied to corresponding input connections of the converter $S\text{-}P_2$ which is of the same type as the converter $S\text{-}P_1$. However, the converter $S\text{-}P_2$ in its similar operation necessarily steers the signals appearing in signal parallel in each operational time slot from the stage $TSI_2$ to a respective one of L converter output circuits corresponding to the L time division signal output paths 12, respectively. Thus, any train of signals applied to an interchanger in stage $TSI_3$, and representing an input signal frame to that interchanger, is located in a stage $TSI_2$ output time slot number corresponding to an output path number of the stage $TSI_3$.

Now reviewing the logic of the FIG. 1 network as thus far described, it will be apparent that it is necessary that, for any signal in a certain operational time slot at the input-to-converter stage $S\text{-}P_1$, the same signal must appear in the same operational time slot number at the output circuit of converter stage $S\text{-}P_2$ which is used by that signal. This relationship will subsequently be shown to be quite useful in performing network pathfinding operations.

Having thus far outlined generally the function of the network in FIG. 1, the control thereof will now be briefly considered. The time slot interchangers schematically represented in the network include control memory arrangements which are appropriate to the type of interchanger employed. Such control memory receives as input from a network central control processor 16, by way of an address insertion logic circuit 17, signals which form in the respective control memories control signal patterns that are appropriate to time slot interchanger operations with respect to the input and output time slot numbers for a particular call connection handled by the time slot interchanger. The types of logic or program utilized to derive time slot and line numbers for the network input and output lines of any particular call connection are known in the art. The manner of using such information for a particular time slot interchanger will depend upon the type of interchanger involved and is, for our magnetic single-wall domain interchanger, considered in our aforementioned time slot interchanger application and in our copending application Ser. No. 204,142, filed Dec. 2, 1971 and entitled "Time Coded Signalling" and assigned to the same assignee as the present application.

Time slot interchangers in FIG. 1 are clocked from a clock timing source 18 which is operated under the control of the processer 16 for providing shift commands in unison to the shift registers of the respective time slot interchangers of the network. In magnetic single-wall domain embodiments, such shift commands are advantageously provided by a rotating in-plane magnetic field which causes the magnetic domains to be propagated along predetermined paths in a synchronous manner. In FIG. 1 a timing bus 19 extending from the clock timing source 18 to each of the three time slot interchanger stages schematically represents the provision of such timing to the various interchangers in whatever form those interchangers may take.

In similar fashion, timing signal buses 20 and 21 schematically represent arrangements for providing shift commands from the clock timing source 18 to the converter stages $S\text{-}P_1$ and $S\text{-}P_2$ for supplying row and column shift commands, respectively. Thus, for a single-wall domain converter embodiment, these converter timing signals represent both the rotating magnetic field for causing domain propagation and the multiphase control signals that permit simultaneous, noninterfering row and column shifts, as well as signal transfers between row and column propagation paths.

For pathfinding, or connect-search, operations the input and output time slot and line numbers for a desired call connection are obtained in the usual way for stored program controlled switching and communication systems. Various techniques for accomplishing this purpose are known in the art and comprise no part of the present invention. As disclosed in our aforementioned applications dealing with time slot interchangers and time coded signalling, the magnetic single-wall domain time slot interchanger is capable of responding to signal pulses appearing on appropriate circuits during the input and output time slots, respectively, for automatically determining which time slot interchanger gates should be operated, and in what time slot they should be operated, for completing the desired call connection. Thus, it is necessary only to determine for FIG. 1 the stage $TSI_2$ time slots which are necessary to establish the desired call connection. Converter stages $S\text{-}P_1$ and $S\text{-}P_2$ require no control memory and thus require no pathfinding operations.

It has been noted that the output time slot of an interchanger in stage $TSI_1$ and the input time slot of an interchanger in stage $TSI_3$ for the same call connection must be the same--i.e., operational time slot number $TS_{op}$. Since the circuits in the time shared space division switch 14 are dedicated to serving particular operational time slots, it is only necessary to find the time slot number $TS_{op}$ in order to complete the fund of pathfinding information needed for establishing the call connection in FIG. 1. This determination is advantageously realized by locating a common free time slot number in the output of the calling interchanger in stage $TSI_1$ and in the input of the called interchanger in stage $TSI_3$; and such operation is accomplished by signal matching circuitry. For example, it is assumed that time slot words provided in the network of FIG. 1 include a busy bit for indicating whether or not that particular time slot is being utilized in a call connection. Switching network uses of the busy bit technique are disclosed and claimed in the copending R. S. Krupp application Ser. No. 212,348, filed on even date herewith, entitled "Busy Bit for Time Division Multiplex Signals to Reduce Signal Processing Time," and assigned to the same assignee as the present application.

In accordance with one application of the busy bit technique shown in the last-mentioned Krupp application, a multiplexer frames the time division signals and includes in each time slot word, in a predetermined bit position, either a binary ONE indicating that the time slot is in use for a call connection or a binary ZERO indicating that the time slot is available. In FIG. 1, each of the interchangers of stage $TSI_1$ has a connection from its output circuit to an inhibiting input on a different one of a set of gates 22 in an input circuit selection logic 23. For a connect-search operation, one of those gates is selectively enabled during the busy bit interval by an output signal from central control processor 16 on a conductor of bus 24 corresponding to the number of the input signal path being used for a call connection that is to be made. The gate 22 thus selected produces a ONE output through an OR gate 25 only when the binary signal state of the busy bit for that particular line indicates an available time slot. Output from gate 25 is applied as an enabling input signal to an AND gate 26.

Similarly, a connection is provided from each input circuit of a time slot interchanger in stage $TSI_3$ to an output circuit selection logic 27, which is of the same type as the logic circuit 23 just described. In this case, however, the gates of logic 27 are selected by signals from central control processor 16 on respective circuits of a bus 28 to enable a gate corresponding to the called interchanger in stage $TSI_3$. Processor 16 determines, in a well-known fashion, the circuits to be selected in busses 24 and 28 on the basis of line identification signals indicating the calling and called network terminations. An output from logic 27 is provided to a further enabling input connection of gate 26.

Clock timing circuit 18 provides a timing pulse on a circuit 30 to still another enabling input connection on gate 26 during the busy bit interval of each time slot interval for a time division signal frame having M time slots per frame. The latter number of time slots are those which characterize time division signals in the output circuits of stage $TSI_1$ and the input circuits of stage $TSI_3$.

By the matching arrangement just described, the busy bits for each time slot on the calling input and called output of switch 14 are compared until a condition is found wherein the same time slot is available at both ends of the time shared space division switch 14. When such a match occurs, coincidence gate 26 is actuated to provide a signal on lead 29 to the address insertion logic 17. Circuits of a well-known type within the logic 17 identify the time slot number during which the match occurred and utilize that number for two purposes. One of these purposes is the utilization of that operational time slot number as the output time slot for the calling path interchanger in stage $TSI_1$ and the input time slot number for the called path interchanger in stage $TSI_3$. A second utilization of the operational time slot number identified by logic 17 is that of indicating which of the interchangers of stage $TSI_2$ is to have its switching circuit employed for completing the call connection through switch 14. Then the calling and called interchanger line numbers are utilized as the input and output time slot numbers, respectively, for the stage $TSI_2$ interchanger that is numbered the same as the operational time slot number $TS_{op}$ just identified by the busy bit match. A bus 32 from logic 17 schematically represents the distribution of the time slot information to control memories of appropriate interchangers in the three stages $TSI_1$, $TSI_2$, and $TSI_3$.

In order to take down a call connection upon termination of the call, the aforementioned multiplexer, not shown, simply erases the busy bit in the time slot of the call which is being terminated, and control memory entries for that call are automatically thereafter erased in ripple fashion in successive time slots as taught in our aforementioned time slot interchanger application and in the aforementioned Krupp application.

Figure 1A:
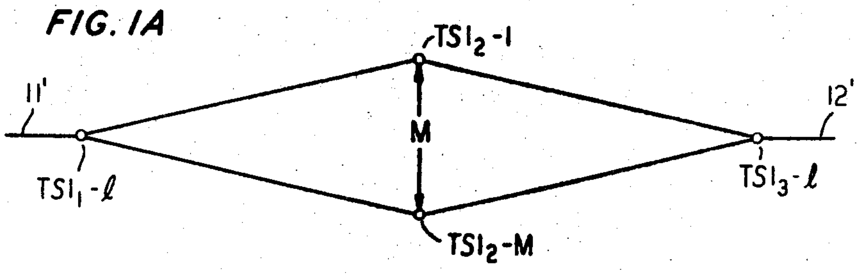
FIG. 1A is a so-called "spider web" diagram of signal path choices for the network of FIG. 1.

FIG. 1A is a so-called "spider web" diagram illustrating for FIG. 1 all of the possible signal path alternatives along which a call might be routed between a given input signal path 11' and a corresponding output signal path 12' for the same call connection. Each node in the diagram of FIG. 1A corresponds to a time slot interchanger in the network of FIG. 1, and each line between nodes corresponds to a time slot signal path between the corresponding interchangers. The diagram generally depicts any one interchanger of the L interchangers in stage $TSI_1$, and a similar interchanger of stage $TSI_3$ with M alternate paths through stage $TSI_2$. Blocking probability in the switching network can be shown by known mathematical techniques to be a function of the relative magnitudes of N, the number of time slots per frame on lines 11' and 12', and M, the number of switching circuits passing through the interchanger stage $TSI_2$. A third factor, *p*, represents the occupancy or utilization level of the time division circuits 11 and 12 in FIG. 1 and also influences the blocking probability of the network.

Figure 3:
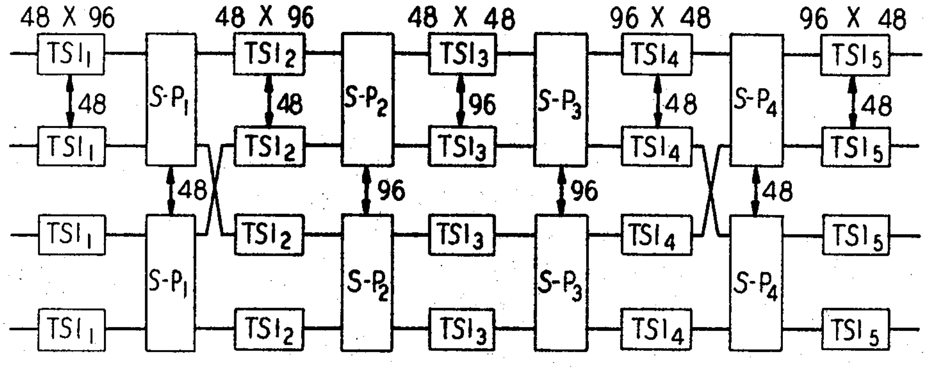
FIG. 3 is a simplified block and line diagram of a five-stage non-blocking switching network in accordance with the invention.

FIG. 3 illustrates a five-stage non-blocking time division switching network utilizing the present invention. This network demonstrates techniques for accommodating a much larger number of lines than can be conveniently handled by a three-stage network of the type illustrated in FIG. 1. It will also be shown in connection with FIG. 3 that a switching network can start out with less than the full complement of equipment indicated in the drawing and grow as traffic demands increase. Suppose that the network of FIG. 1 included 48 input signal paths 11 and 48 output signal paths 12, each of those paths handling 48 time slots per frame and that there were M=96 intermediate time slot interchangers in stage $TSI_2$. Then 2,304 different calls could be accommodated without blocking. The network of FIG. 3 will be shown by similar schematic representations to be capable of handling 110,592 calls. Network control and timing are not shown in FIG. 3, since they are generally of the type already described in connection with FIG. 1. As will be clear from FIG. 3 and its spider web diagram in FIG. 3A, the 5-stage network is really just a 3-stage network in which the central stage switches are themselves nonblocking 3-stage networks which handle 2,304 terminations each.

Network pathfinding operations in FIG. 3 are similar to those already described for FIG. 1. Thus, a first matching operation is performed as to calling and called interchangers of stages $TSI_1$ and $TSI_5$ in the manner described in regard to FIG. 1 to determine which of 96 possible paths will be used through the central part of the network. Then a further matching operation is carried out as to the selected central path in stages $TSI_2$ through $TSI_4$.

The network of FIG. 3 is illustrated as including two separate groups of 48 input signal paths each at the stage $TSI_1$. However, the indication in the drawing of 48 converters in the stage $S\text{-}P_1$ schematically indicates that 48 such input circuit groups are provided. As indicated in the drawing, each time slot interchanger in the stage $TSI_1$ has a 48 × 96 time slot accommodating capacity to provide the aforementioned call capability of 110,592 calls.

As indicated in FIG. 3, each converter $S\text{-}P_1$ has output connections for driving 96 switching circuits, one for each output time slot of stage $TSI_1$, and their respective time slot interchangers in stage $TSI_2$. Since each stage $S\text{-}P_1$ converter output connection extends to a corresponding group of the stage $TSI_2$ interchangers, cross-connection is provided among the groups of circuits in the network. Similarly, corresponding output connections of the respective converters of stage $S\text{-}P_1$ extend to different interchangers of the same group in stage $TSI_2$. These latter interchangers each accommodate input signals having 48 time slots per frame corresponding to the 48 input circuits of the stage $S\text{-}P_1$ converters. Stage $TSI_2$ interchangers provide output signals having 96 time slots per frame. All of the stage $TSI_2$ interchangers in a group provide outputs to a common 48-input stage $S-P_2$ converter, and there are 96 such converters. The 96 output circuits of each converter in stage $S-P_2$ drive a corresponding number of switching circuits and their respective time slot interchangers in a group of the stage $TSI_3$, and these interchangers all have a 48 × 48 time slot accommodating capability. The remainder of the network in FIG. 3 is a mirror image, about an axis at stage $TSI_3$, of that part already described.

Network configuration may be somewhat easier to visualize if it is considered in terms of 48 input planes each including a separate one of the illustrated 48-circuit groups of the circuits of stage $TSI_1$ and the associated stage $S-P_1$ converter of the group. These 48 input planes can then be considered to be oriented parallel to 48 similar output planes each including a converter of stage $S-P_4$ and the associated 48-output path group of stage $TSI_5$. Between the two groups of input and output planes are 96 circuit planes oriented orthogonally with respect to the input and output plane. Each orthogonal plane includes a different group of the interchangers of stage $TSI_3$ with its associated input converter of stage $S-P_2$ and output converter of stage $S-P_3$, as well as the interchangers of stages $TSI_2$ and $TSI_4$ coupled to such converters. The circuits of each of the last-mentioned 96 central planes should be recognized to have the same basic configuration as the three-stage network of FIG. 1. These central planes perform the switch function, already noted for stage $TSI_2$ in FIG. 1, which is performed after the line number to time slot number conversion carried out in interchanger stage $TSI_1$ and converter stage $S-P_1$.

Considering the network of FIG. 3 in a somewhat different functional aspect, each of the converters of stage $S-P_1$ steers signals from any of the 48 stage $TSI_1$ interchangers in the same input plane to any selectable one of the 96 central planes as may be determined by the time slot interchanging function in stage $TSI_1$. Similarly, each converter of stage $S-P_4$ steers signals from any one of the 96 central planes to any selectable one of the stage $TSI_5$ output signal paths in the same output plane as the converter $S-P_4$.

If at the time of the initial installation of the network of the type illustrated in FIG. 3 it is not necessary to provide all of the input and output network terminations, a reduced complement of starting equipment can be provided. One way to do this is to begin with the full complement of equipment for the central stages $TSI_2$ through $TSI_4$ and add the orthogonally oriented input and output plane sets of equipments as they are needed. Another way is to start with half of the central stage planes and add new input and output planes as needed by connecting them in multiple to a pair of central planes. Then when a call capacity of 55,296 terminations is reached, the remainder of the central planes can be added and the connections for half of the input and output planes rearranged to the format shown in FIG. 3.

Figure 3A:
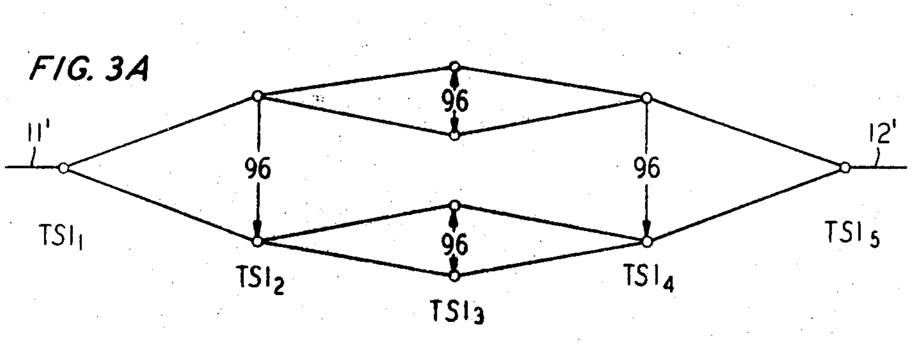
FIG. 3A is a spider web diagram for the network of FIG. 3.

FIG. 3A is a "spider web" diagram of the path alternatives through the network of FIG. 3 for connection between any input path 11' and any output path 12'. This type of diagram facilitates, to some extent, the understanding of the network capabilities. It thus appears from FIG. 3A that from any given signal input path 11' there are 96 path choices at the stage $TSI_1$, and from each interchanger at stage $TSI_2$ there are an additional 96 choices of paths for reaching the interchanger stage $TSI_3$ in the center of the network.

Figure 4:
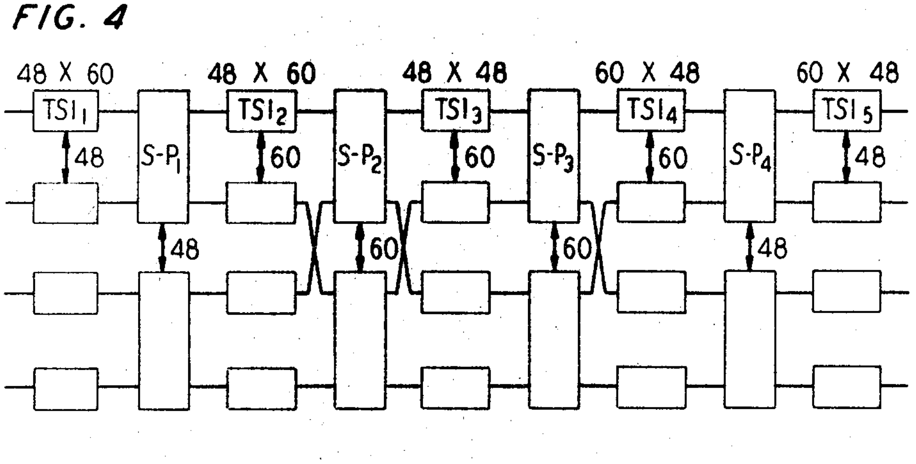
FIG. 4 is a simplified block and line diagram of a five-stage switching network with cross-connected intermediate stages to give a low blocking probability with relatively low hardware requirements.

FIG. 4 is a modified five-stage network having a reduced number of central stage circuit planes and also having a modified type of cross-connections between circuit groups. In FIG. 4, cross-connections are provided at the outputs of stage $TSI_2$ interchangers and at the inputs to stage $TSI_4$ interchangers. In addition, cross-coupling connections are employed at the outputs of the converters of stage $S-P_2$ for reducing the blocking probability that would otherwise result from the reduction in the number of central stage equipment planes. Thus, in FIG. 4, the circuit components and time slots that were 96 in number in FIG. 3 are reduced to 60 in FIG. 4; but the blocking probability can be shown to be approximately $10^{-10}$ with a full input path occupancy.

The central stage equipment planes in FIG. 4 no longer evidence the clear tie to the network format of FIG. 1 because each converter of stage $S-P_2$ no longer has its output connections all directed to the same group of interchangers in stage $TSI_3$ since it now has its differently designated 60 output connections each coupled to a correspondingly designated interchanger in each of the 60 groups of the stage $TSI_3$. It is, nevertheless, apparent that the network of FIG. 4 still utilizes the concept of combining time slot interchangers and mass serial-parallel converters in different combinations for accomplishing conversion of time slot numbers to line numbers, as already described in connection with FIG. 1. Considerations of network growth from a reduced complement of initial network equipment are similar to those just outlined in regard to FIG. 3.

Figure 4A:
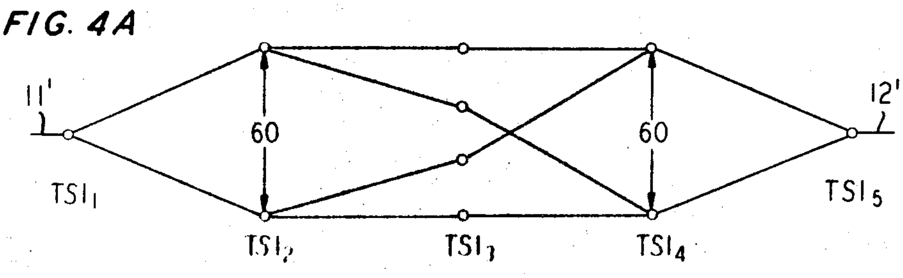
FIG. 4A is a spider web diagram for the network of FIG. 4.

FIG. 4A is a "spider web" diagram of the alternate signal paths in the network of FIG. 4 between any given input path 11' and an output path 12' for the same call connection. The double cross-coupling utilized for reaching the stage $TSI_3$ changes the network format substantially and also changes the blocking probability. This network format can be shown mathematically to eliminate entirely the possibility of mismatching blocking, i.e., the inability to find some time path which will allow a connection between a prescribed set of input and output lines in particular time slots on those lines.

Some of the preceding network configurations have been described in terms of embodiments having relatively large numbers of time slots and thus employing correspondingly large sized time slot interchangers and mass series-parallel converters. In addition to the apparent hardware requirements, relatively high processing speed is required. However, the processing speeds are advantageously reduced by a network organization to be discussed in connection with FIGS. 5A and 5B.

Figure 5A:
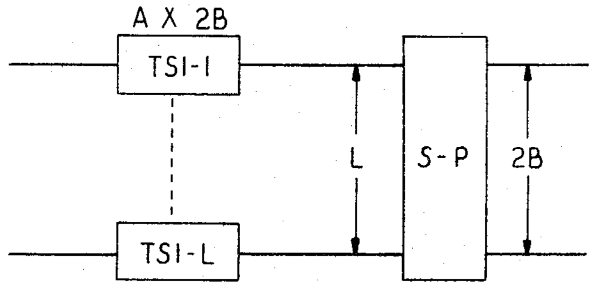
FIGS. 5A and 5B are alternative forms of a switching network module.
Figure 5B:
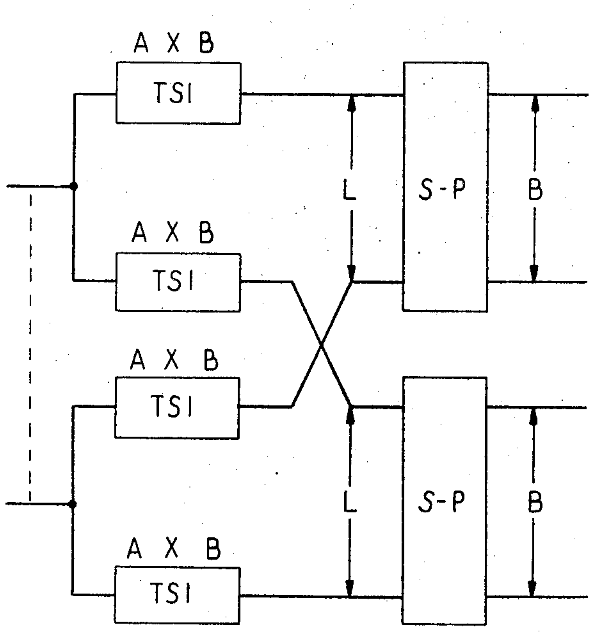

FIG. 5A illustrates an interchanger-converter combination of the type already utilized in networks previously here considered. L time slot interchangers, each having A × 2B time slot handling capacity, are shown with their outputs sorted by an S-P converter having 2B output circuits. FIG. 5B shows a modification of the interchanger-converter combination, which performs all of the functions of the FIG. 5A combination, but which uses two S-P converters of half the size of the one in FIG. 5A, and which uses twice as many interchangers each half the size of the ones in FIG. 5A. Similarly the mirror image of the FIG. 5B combination is capable of replacing the mirror image of the FIG. 5A combination. Since substitutions between these types of combinations do not change the network spider web diagram, blocking probabilities and control procedures are not substantially altered.

Although the present invention has been described with reference to particular embodiments thereof, it is to be understood that additional embodiments and modifications which will be obvious to those skilled in the art are included within the spirit and scope of the invention.

What is claimed is:

1. A time division multiplex switching network for selectively interconnecting a plurality of time slot signals on each of a plurality of input lines to selectable output lines in different selectable time slots of recurrent time frames, said network comprising means, connected in each of said input lines, for time slot interchanging signals in such lines to respective selectable interchanger output time slots, converter means, operative in each of said interchanger output time slots, for applying signals at interchanger outputs for all of said input lines in word-series to a different converter means output path corresponding to such time slot, a pluraity of time slot interchanging switching paths, each of said paths being coupled to a different one of said converter means output paths and including a different time slot interchanger means for transferring each input time slot signal in such interchanging switching path to a time slot corresponding to a particular one of said output lines, further means, operative in each output time slot of said switching paths, for applying the signals from outputs of all of such switching paths in word-series to respective ones of said output lines, and further time slot interchanging means in each of said output lines for shifting time slot signals in such line to respective predetermined output time slots for establishing time division multiplex communication through said network.

2. In combination, at least one input circuit for time division multiplex signals, said signals including a predetermined number of time slot signals in recurring time frames, a plurality of time slot interchangers, one corresponding to each time slot of a signal frame, each interchanger having an input and an output, means for applying each time slot signal of a frame of signals from said circuit to an input of its corresponding one of said interchangers, respectively, in time slot signal parallel, and means for controlling each of said interchangers to switch each time slot signals applied thereto to a selectable time slot in the output of such interchanger.

3. In a multistage time division switching network for providing selectable communication connections in different time slots of recurrent communication signal time frames, a first stage comprising time slot interchanging means, said stage having a plurality of outputs, a second stage comprising a plurality of time slot interchangers, one for each time slot in a frame in an output of said first stage time slot interchanging means, and interstage coupling means between said first and second stages and comprising means for converting each set of simultaneously occurring time slot signals from different outputs of said first stage into a series train of signals for application of each such set to a different interchanger of said second stage.

4. In a multistage time division switching network for supplying selectable communication connections in different time slots of recurrent communication signal time frames, a plurality of time slot interchangers in each of said stages, each interchanger having an input connection and an output connection, and all interchangers of a stage being formed into at least one group, means for coupling said stages of interchangers in a predetermined tandem sequence extending from a network input stage to a network output stage, said coupling means comprising between each pair of successive stages in said sequence at least one mass series-parallel converter connected between a group of interchangers of a first stage and a group of interchangers of a following stage in said sequence, interchangers of said input stage being grouped so all interchanger outputs of a group are coupled to a single one of said converters, interchangers of said output stage being grouped so all interchanger inputs of a group are coupled from a single one of said converters, and at least one intermediate interchanger stage is included in said sequence.

5. The network in accordance with claim 4 in which only a single intermediate stage of time slot interchangers is provided in said sequence.

6. The network in accordance with claim 4 in which a plurality of said intermediate stages are provided in an intermediate stage sequence in which a first stage of said intermediate sequence has the interchangers thereof grouped into plural groups, a last stage of said intermediate sequence has the interchangers thereof grouped into plural groups, and said intermediate sequence includes a further interchanger stage having interchangers thereof grouped into plural groups.

7. The network in accordance with claim 6 in which said coupling means converters include means for connecting all inputs of each group of interchangers of said further stage to receive from a single converter, means for connecting all outputs of each group of interchangers of said further stage to a single converter, means for cross coupling each group of said input stage interchangers to different groups of said first intermediate stage interchangers, and means for cross coupling each group of said last intermediate stage interchangers to different groups of said output stage interchangers.

8. The network in accordance with claim 6 in which said coupling means converters include means for connecting all inputs of each group of interchangers of said further stage to receive from a different converter, means for connecting all outputs of each group of interchangers of said further stage to a single converter, means for cross coupling outputs of each group of first intermediate stage interchangers to different ones of said converters, and means for cross coupling inputs of each group of last intermediate stage interchangers to receive from different ones of said converters.

9. In a multistage time division switching network for providing selectable communication connections in different time slots of recurrent communication signal time frames, a plurality of time division multiplex input paths and a plurality of time division multiplex output paths in each stage of said network, a plurality of time slot interchanging means for each of said stages, each such interchanging means being connected to receive time division signals from a different one of the input paths of such stage, and at least one converting means in each of said stages, except the final stage, in said network, each said converting means being operable to convert an input time slot number into an output path number and comprising a plurality of signal propagation circuits, one for each time slot of a time division signal frame in said interchanging means, and means for steering time slot signals in each time slot of a signal frame in said input paths to a different one of said propagation circuits.

10. The network in accordance with claim 9 in which each input path of a stage of said network is connected through a single one of said interchanging means to said converting means of such stage.

11. The network in accordance with claim 9 in which each input path of at least one stage of said network is connected through *n* of said interchanging means of such stage to said converting means of such stage, a plurality *n* of said converting means are provided in such stage to provide for such stage a total number of said output paths equal to *n* times the total number of time slots per frame of signals in outputs of said interchanging means of such stage, and means are provided for coupling the output of each of said *n* interchanging means to a different one of said *n* converting means.

12. The switching network in accordance with claim 9 in which said network includes three tandem connected stages and each of said converting means comprises means for receiving the outputs of all time slot interchangers of the preceding stage in said sequence, and means for coupling output circuits of such converting means to input circuits of all time slot interchangers, respectively, of the next succeeding stage in said sequence.

13. The switching network in accordance with claim 9 in which each of said steering means comprises a two-dimensional shift register including means for shifting signals from said input paths in one direction along a plurality of signal shifting paths, respectively, and means for shifting signals along a plurality of paths which are perpendicular to and intersect the first-mentioned shifting paths to said output paths, respectively.

14. The switching network in accordance with claim 9 in which each of said converting means comprises means for delaying by a different number of time slots the time slot signals received in each input time slot of such converting means.

* * * * *